United States Patent
Paulraj et al.

(10) Patent No.: US 12,093,337 B1
(45) Date of Patent: Sep. 17, 2024

(54) SYSTEM AND METHOD FOR MANAGING VIEW TIME USING CHAIN OF ACTION ANALYSIS

(71) Applicant: Dell Products L.P., Round Rock, TX (US)

(72) Inventors: Deepaganesh Paulraj, Bangalore (IN); Ashok Narayanan Potti, Bangalore (IN); Dale Wang, Hayward, CA (US); Min Gong, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/192,308

(22) Filed: Mar. 29, 2023

(51) Int. Cl.
*G06F 16/9535* (2019.01)
*G06F 16/957* (2019.01)
*G06F 16/958* (2019.01)
*H04L 67/50* (2022.01)

(52) U.S. Cl.
CPC .......... *G06F 16/957* (2019.01); *G06F 16/958* (2019.01); *H04L 67/535* (2022.05)

(58) Field of Classification Search
CPC ..... H04L 67/535; G06F 16/957; G06F 16/958
See application file for complete search history.

(56) References Cited

U.S. PATENT DOCUMENTS

| | | | |
|---|---|---|---|
| 8,538,897 B2 | 9/2013 | Han et al. | |
| 10,572,329 B2 | 2/2020 | Harutyunyan et al. | |
| 10,740,793 B1 * | 8/2020 | Sussman | G06Q 30/0255 |
| 10,776,196 B2 | 9/2020 | Ohana et al. | |
| 10,853,867 B1 * | 12/2020 | Bulusu | G06Q 30/0631 |
| 11,513,930 B2 | 11/2022 | Chan et al. | |
| 11,720,940 B2 * | 8/2023 | Lakshminarayan | G06Q 30/06 705/26.1 |
| 11,909,836 B2 * | 2/2024 | Wulf | G06F 11/3024 |
| 2009/0113248 A1 | 4/2009 | Bock et al. | |
| 2009/0216910 A1 | 8/2009 | Duchesneau | |

(Continued)

FOREIGN PATENT DOCUMENTS

| | | | | |
|---|---|---|---|---|
| CN | 108280168 A | * | 7/2018 | ......... G06F 16/9535 |
| CN | 111476371 A | * | 7/2020 | ............. G06N 7/005 |

(Continued)

*Primary Examiner* — Tarek Chbouki
(74) *Attorney, Agent, or Firm* — Womble Bond Dickinson (US) LLP

(57) ABSTRACT

Methods and systems for managing display of a website to a user are disclosed. Data processing systems operating the website may perform operator actions that increase the likelihood of achieving operational goals, such as presenting relevant content to the user to increase view time and/or user retention. To identify appropriate operator actions, logs (e.g., historical browsing data) may be obtained for various users of the website. The logs may record user actions, operator actions, and/or other information that describes historical and/or current user browsing activity. Inference models may be implemented to predict probable user actions, and associated user action information based on the log information. The predictions may be presented as an acyclic graph that associates the operator actions, user actions, and user action information. The graph may be analyzed to identify operator actions that may maximize user retention and/or increase the likelihood of meeting other operational goals.

20 Claims, 10 Drawing Sheets

(56) References Cited

U.S. PATENT DOCUMENTS

| | | | |
|---|---|---|---|
| 2010/0257058 A1* | 10/2010 | Karidi | G06Q 30/02 705/26.1 |
| 2010/0318856 A1 | 12/2010 | Yoshida | |
| 2013/0041748 A1* | 2/2013 | Hsiao | G06Q 30/02 705/14.41 |
| 2013/0198240 A1* | 8/2013 | Ameri-Yahia | G06Q 30/02 707/E17.011 |
| 2015/0227838 A1 | 8/2015 | Wang et al. | |
| 2015/0288557 A1 | 10/2015 | Gates et al. | |
| 2019/0095313 A1 | 3/2019 | Xu et al. | |
| 2019/0129785 A1 | 5/2019 | Liu et al. | |
| 2020/0026590 A1 | 1/2020 | Lopez et al. | |
| 2021/0027205 A1 | 1/2021 | Sevakula et al. | |
| 2021/0241141 A1 | 8/2021 | Dugger et al. | |
| 2022/0100187 A1 | 3/2022 | Isik et al. | |
| 2022/0283890 A1 | 9/2022 | Chopra et al. | |
| 2022/0358005 A1 | 11/2022 | Saha et al. | |
| 2022/0417078 A1 | 12/2022 | Matsuo et al. | |
| 2023/0016199 A1* | 1/2023 | Jividen | H04L 41/12 |
| 2024/0028955 A1 | 1/2024 | Harutyunyan et al. | |

FOREIGN PATENT DOCUMENTS

| | | | | |
|---|---|---|---|---|
| CN | 112541806 A | * | 3/2021 | |
| EP | 4235505 A1 | * | 8/2023 | G06N 3/006 |

\* cited by examiner

Data Table 250

| Series of Operator Actions | User Action ID | Time-to-User-Action |
|---|---|---|
| AABBCCC | U1 | 10 |
| ACABBCCC | U1 | 15 |
| CCBADEFF | U3 | 30 |
| AABBCCC BAABCAADD CCBADEFF | U1, U2, U3 | 10, 30, 40 |
| BAABCAAD AABBCCC | U2, U1 | 20, 15 |
| ... | ... | ... |

FIG. 2D

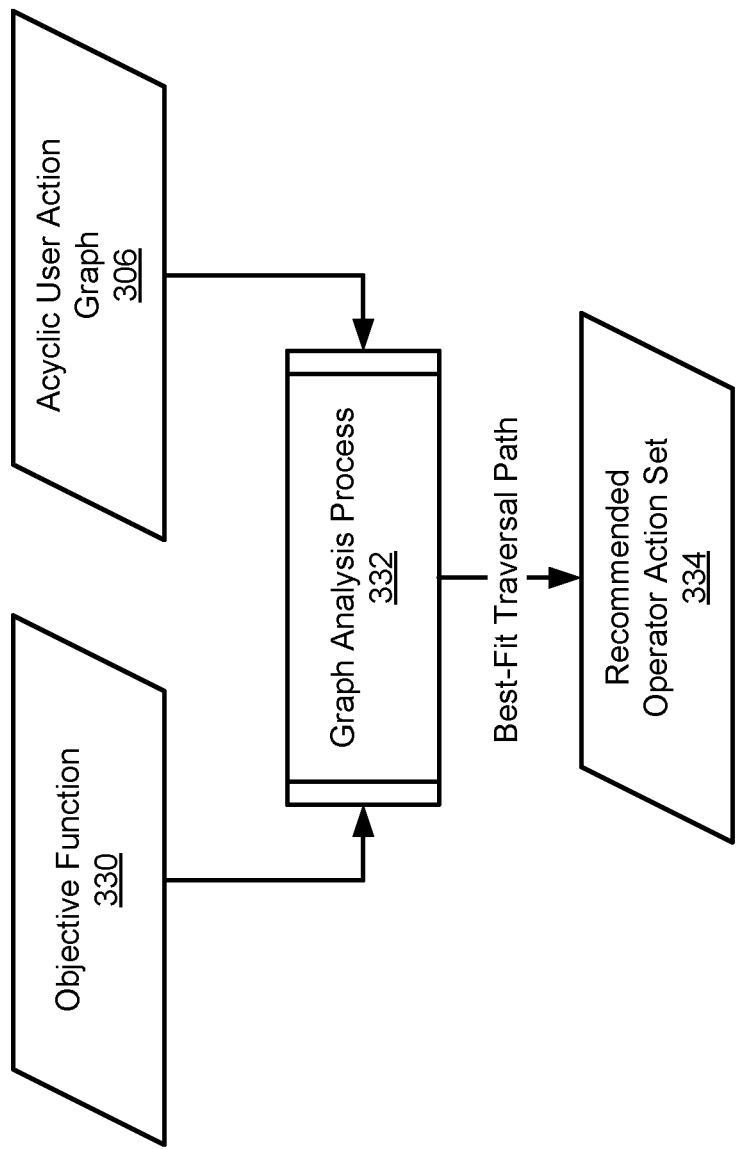

SYSTEM AND METHOD FOR MANAGING VIEW TIME USING CHAIN OF ACTION ANALYSIS

FIELD

Embodiments disclosed herein relate generally to device management. More particularly, embodiments disclosed herein relate to systems and methods to manage the operation of systems to meet operational goals.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 2D shows an example of user action information in accordance with an embodiment.

FIG. 3C shows a data flow diagram illustrating a process of analyzing an acyclic user action graph in accordance with an embodiment.

DETAILED DESCRIPTION

Figure 1:
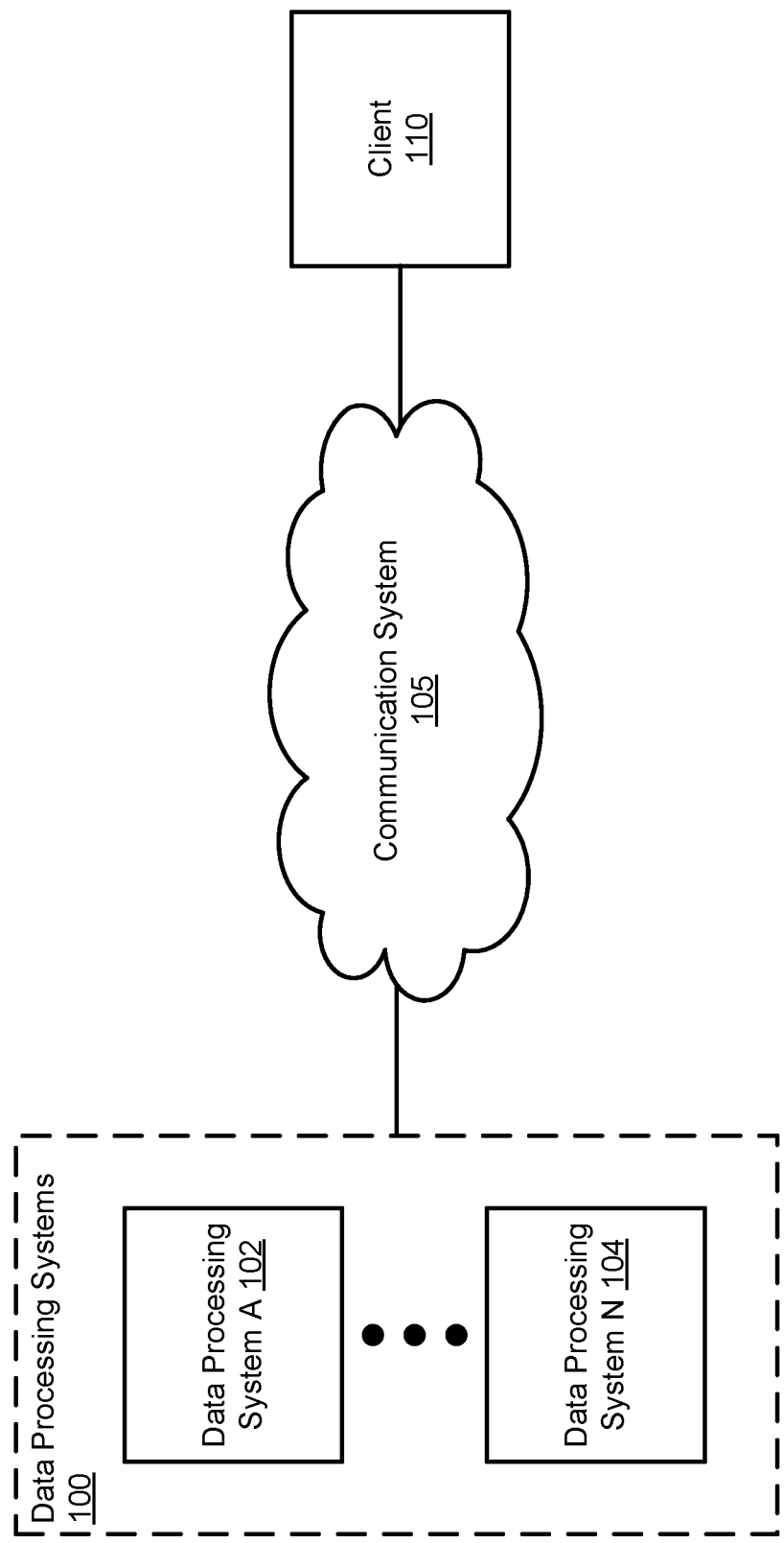
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing display of a website to a user. A data processing system may provide computer-implemented services (e.g., web services) to downstream consumers. For example, the data processing system may provide a website to display provided content to a user. To provide web services to downstream consumers (e.g., users), the data processing system may perform operator actions (e.g., controlling the content presented to users). The downstream consumers may perform actions (e.g., user actions) in response to operator actions.

In order to maintain and/or increase user retention, the data processing system may use computing resources to provide appropriate (e.g., relevant) website content to the user. An improper action performed by the data processing system (e.g., ineffective display of content and/or display of irrelevant content) may result in an inefficient use of computing resources and/or reduced performance of the website. The reduced performance of the website may negatively impact the view time of the user (e.g., decrease viewer retention). For example, if a user is presented with undesired and/or irrelevant content, then the user may respond (e.g., perform a user action) by terminating the computer-implemented services (e.g., exiting the website). Thus, to improve user retention and/or view time (e.g., time-on-page), the display of website content to the user may be managed.

To manage the display of a website to the user, a data processing system may obtain records of interactions between the user and the website, such as logs. The logs may reflect historical operations of both the data processing systems (e.g., operator actions) and/or of the user (e.g., user actions). In other words, the logs (e.g., historical browsing data) may include information relating operator actions and user actions, and/or may be able to provide causality for significant user actions such as a user termination of web services (e.g., the user exiting the website). Thus, historical browsing data, for example, may provide information that may be used to predict the future actions of the user of the website, including user exits. However, the volume of data included in the logs and/or the variability in the content requirements for each user may render the historical browsing data impractical for manual analysis.

To improve website user retention (e.g., to mitigate and/or prevent user exits), large volumes of log data (e.g., historical browsing data) may be analyzed by machine-learning algorithms to obtain (e.g., train) various types of inference models. The trained inference models may be used in sequence and/or conjunction to identify operator action patterns that relate to user actions from large amounts of log data (e.g., ingest data). That is, the trained inference models may be trained to ingest current browsing data and subsequently predict a user action based on the current browsing status of the user and/or prior operator actions.

The identification of a single user action alone may not provide sufficient information for efficient and effective mitigation and/or prevention of a user exit. The single user action may impact subsequent operator actions and/or user actions, which may ultimately result in a user exit (e.g., of the website). Accordingly, sequences of user actions may be predicted using the trained inference models, based on patterns from historical browsing data (e.g., patterns of operator actions and user actions), up to and/or including full user termination of web services (e.g., user exit). These patterns may be used to identify operator actions that may be more likely to increase view time and/or engage (e.g., retain) the user.

User action information such as the time between user actions (e.g., time-on-page) may be predicted for each user action in the user action sequence. The user action information may be predicted using attribution score analysis (e.g., an inference model may be trained to assign attribution scores to portions of the historical browsing data). Attribution scores may be used to identify portions of log data (e.g., log segments) that contribute to the occurrence of a predicted future user action. The attribution scores may be analyzed to determine, for example, the time-on-page of the user before the user performs another action (e.g., navigating to another page of the website) using timestamp information recorded in the log data.

The user action information may be presented using an acyclic graph (e.g., an acyclic user action graph) that may be analyzed to allow for proper assessment of the predicted user action sequences. The analysis may provide an overview of the ability of the data processing system to retain website users and may allow for the identification of operator actions that may be implemented to improve user retention and/or other operational goals.

By doing so, an improved computing device and/or distributed system may be obtained. The improved device and/or system may be more likely to be able to provide the desired computer-implemented services in view of optimizing operational goals. For example, the system may perform recommended operator actions (e.g., based on user actions) in order to improve user retention, computing resource allocation, operator revenue, and/or other types of objectives.

In an embodiment, a computer implemented method for managing display of a website to a user is provided. The method may include obtaining historical browsing data for the website, and obtaining an acyclic graph based on the historical browsing data, the acyclic graph comprising a plurality of nodes connected by a plurality of edges, the plurality of edges representing relationships between the plurality of nodes, and the relationships being probabilistically defined based on the historical browsing data.

The method may also include: identifying an operational goal for the website; analyzing the acyclic graph, based on the operational goal, to obtain an action set for the website; and, initiating performance of the action set by a data processing system that displays the website to the user, to increase a likelihood of meeting the operational goal.

Obtaining the acyclic graph may include: establishing a second node based on a second user action with respect to the website, the second user action occurring after a first user action with respect to the website, and the first user action being represented by a first node; establishing a first edge between the first node and the second node, the first edge being associated with a first relationship; establishing a third node based on a third user action with respect to the website, the third user action occurring after the second user action; and, establishing a second edge between the second node and the third node, the second edge being associated with a second relationship.

The first relationship may indicate a duration of time between when the second user action occurred and when the first user action occurred. The second relationship may indicate a duration of time between when the third user action occurred and when second user action occurred.

The first relationship may further indicate a generalized series of operator actions that occurred between when the second user action occurred and when the first user action occurred. The second relationship may further indicate a generalized series of operator actions that occurred between when the third user action occurred and when the second user action occurred.

The operational goal may be selected from a group of operational goals consisting of bounce rate minimization, revenue maximization, conversion maximization, session time maximization, and time-on-page maximization.

The historical browsing data may reflect visits to the website of multiple users.

Analyzing the acyclic graph may include enumerating traversal paths through the acyclic graph. For each traversal path of the enumerated traversal paths, the method may include: obtaining an aggregate relationship based on the relationship of each of the edges along the traversal path; obtaining a fitness value based on the aggregate relationship and the operational goal; and, obtaining a rank for the traversal path based on the fitness value, the rank being usable to order the traversal paths.

The method may further include selecting a best fit traversal path of the traversal paths based on the ranks of the traversal paths; and obtaining the action set based on the best fit traversal path.

In an embodiment, a non-transitory media is provided. The non-transitory media may include instructions that when executed by a processor cause the computer implemented method to be performed.

In an embodiment, a data processing system is provided. The data processing system may include the non-transitory media and a processor, and may perform the computer implemented method when the computer instructions are executed by the process.

Turning to FIG. 1, a block diagram illustrating a system in accordance with an embodiment is shown. The system shown in FIG. 1 may provide computer-implemented services. The system may include data processing systems 100. Data processing systems 100 may include any number of computing devices that provide the computer-implemented services. For example, data processing systems 100 may include one or more data processing systems 102, 104 that may independently and/or cooperatively provide the computer-implemented services.

For example, all, or a portion, of data processing systems 102-104 may provide computer-implemented services to users and/or other computing devices operably connected to data processing systems 100. The computer-implemented services may include any type and quantity of services including, for example, web services, database services, instant messaging services, video conferencing services, etc. Different systems may provide similar and/or different computer-implemented services.

To provide the computer-implemented services, data processing systems 100 may host applications that provide these (and/or other) computer-implemented services. The applications may be hosted by one or more of data processing systems 100. The computer-implemented services may be provided to a user via client 110. For example, the computer-implemented services may be web services and may be provided to a client device that displays a website to a user.

Any of data processing systems 102-104 and hosted entities (e.g., applications that provide computer-implemented services, other applications that manage the operation of data processing systems 100, etc.), may be subject to undesired operation. For example, a data processing system providing web services (e.g., a website) to a user may provide undesired content to the user, diverging from nominal (e.g., desired) operation. An undesired operation may reduce the quality of the computer-implemented services provided by the data processing systems, which may negatively impact user retention.

The quality of services provided by any of data processing systems 102-104 may be influenced by operator actions (e.g., actions of an operator that provides the computer-implemented services), and/or by user actions (e.g., subsequent user actions in a series of user actions). For example, an operator action (or inaction) may cause a user to terminate the computer-implemented services (e.g., exit a website) at a faster rate than if different operator action(s) had been performed. These operator actions, user actions (e.g., user reactions to operator actions) may be recorded and logged. For example, information such as operator actions and user actions may be recorded by data processing systems 100 in the form of historical browsing data (e.g., website browsing data)

While web services are being provided to a user by one or more of data processing systems 100, any of the components of the system described in FIG. 1 may generate one or more logs (e.g., historical browsing data). A log may be a data structure that includes operational information regarding data processing systems 100 such as (i) descriptions of conditions encountered by a data processing system providing web services (e.g., user actions, operator actions, content information, and/or user information), (ii) a time when the condition was encountered, (iii) an identifier associated with a condition and/or generator of the log, (iv) an indication of a relative level of importance or severity of the encountered conditions, and/or (v) other types of information.

While the logs may include information regarding the current operation of data processing systems 100, the logs may not specify whether portions of the log (e.g., log segments) are indicative of potential undesired operation of the data processing systems 100 and/or components thereof, and/or may lack other information that may be used to manage data processing systems 100. Rather, the logs may generally include a representation of current and/or past operation of all or a portion of data processing systems 100. Thus, the logs alone may not be useful for proactively addressing potential future undesirable operating conditions (e.g., a reduction in quality of web services provided to a user as a result of operator actions) of data processing systems 100, and/or causes of the potential undesired operation of data processing systems 100.

For example, historical browsing data alone may not indicate the likely future actions of a user (e.g., the user reacting to an improvement or reduction in quality of the provided web services as a result of operator actions). Additionally, it may not be clear how any particular portion of historical browsing data relates to user retention (e.g., affected by the quality of the web services provided to the user) and therefore the type and/or series of actions that the user may perform.

In general, embodiments disclosed herein may provide systems, devices, and methods for managing data processing systems that provide web services to users, in order to reduce the likelihood of the data processing systems operating in an undesired manner. The data processing systems may be managed by identifying probable user actions (e.g., a series of user actions), and associated user action information (e.g., time-on-page and/or session time). The user actions and associated information may be related to operator actions (e.g., an operator action set) in terms of causality based on the historical browsing data. Based on one or more operational goals (e.g., maximizing time-on-page and/or session time), a series of operator actions may be identified and/or implemented that may be more likely to influence user actions (e.g., through personalization of website content) and/or cause the data processing systems to meet the operation goals.

A system in accordance with an embodiment may include a data processing system manager. The data processing system manager may manage the operation of data processing systems 100. The data processing system manager may operate independently from and/or be a part of data processing systems 100.

To provide its functionality, the data processing system manager may (i) obtain logs (e.g., historical browsing data for one or more users accessing a website serviced by any of data processing systems 100), (ii) predict future user actions based on the logs (e.g., using a trained inference model), (iii) utilize one or more trained inference models to predict associated user action information (e.g., time-on-page and/or session time before one or more future user actions), (iv) obtain an acyclic graph representing the predicted user actions (e.g., user action sequences) and associated user action information, (v) analyze the acyclic graph to identify operator actions that may be implemented to increase the likelihood of achieving an operational goal, and/or (vi) initiate performance of one or more operator actions (e.g., an "operator action set") that may remediate potential undesirable operation and/or reduce the likelihood of data processing systems 100 operating in an undesirable manner in the future, thereby improving the likelihood of meeting the operational goals.

By doing so, a system in accordance with embodiments disclosed herein may provide computer-implemented services (e.g., web services) having, for example, (i) improved user view time and/or retention, and/or (ii) improved computing resource availability for desired computer-implemented services (e.g., presenting relevant content to the user) by reducing computing resource expenditures for undesired computer-implemented services (e.g., presenting irrelevant content to the user).

Figure 4:
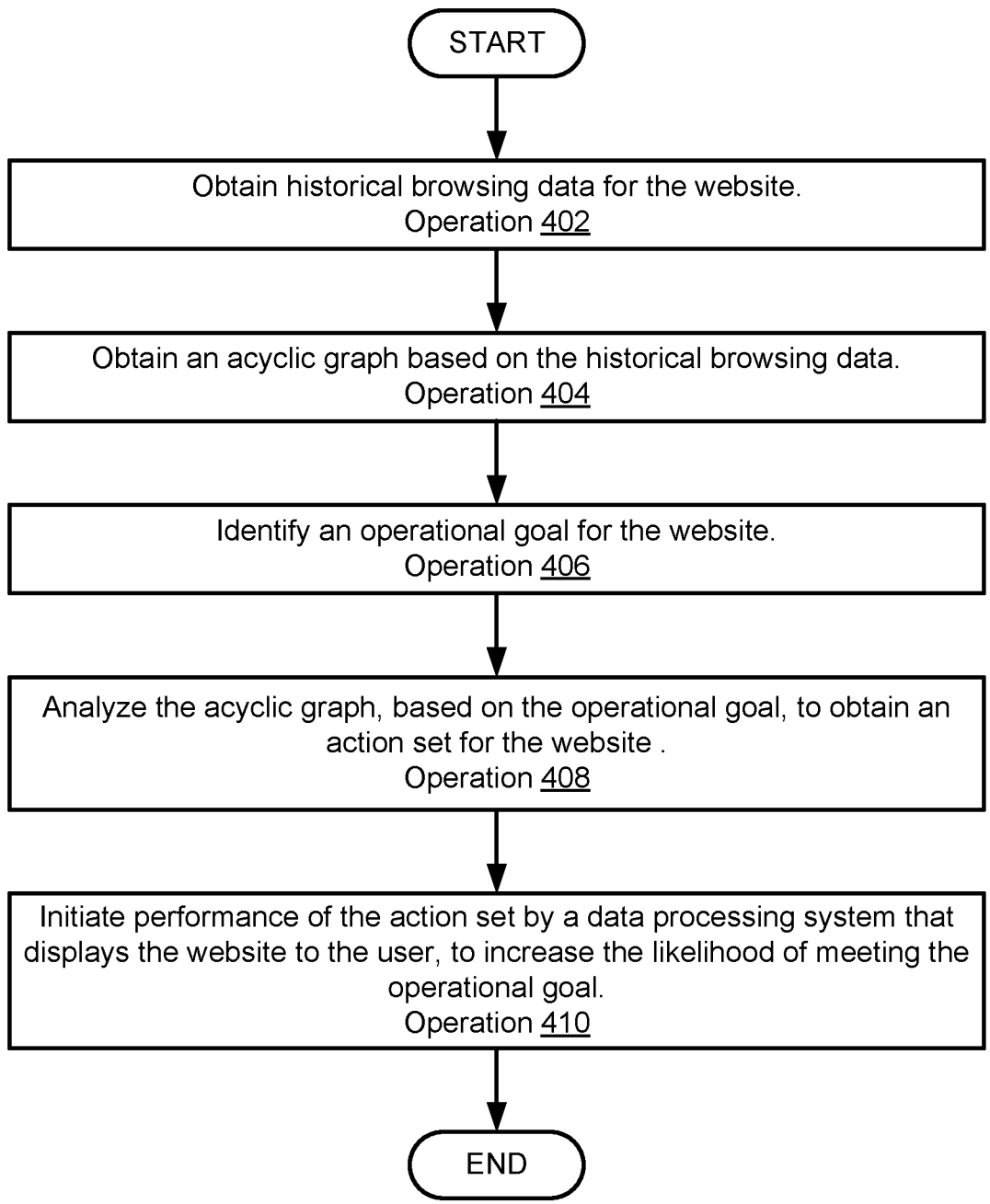
FIG. 4 shows a flow diagram illustrating a method of managing display of a website to a user in accordance with an embodiment.

When providing its functionality, the data processing system manager may perform all, or a portion, of the method and/or actions shown in FIG. 4.

Data processing systems 100 and/or client 110 may be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. For additional details regarding computing devices, refer to FIG. 5.

Any of the components illustrated in FIG. 1 may be operably connected to each other (and/or components not illustrated) with a communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

Figure 2A:
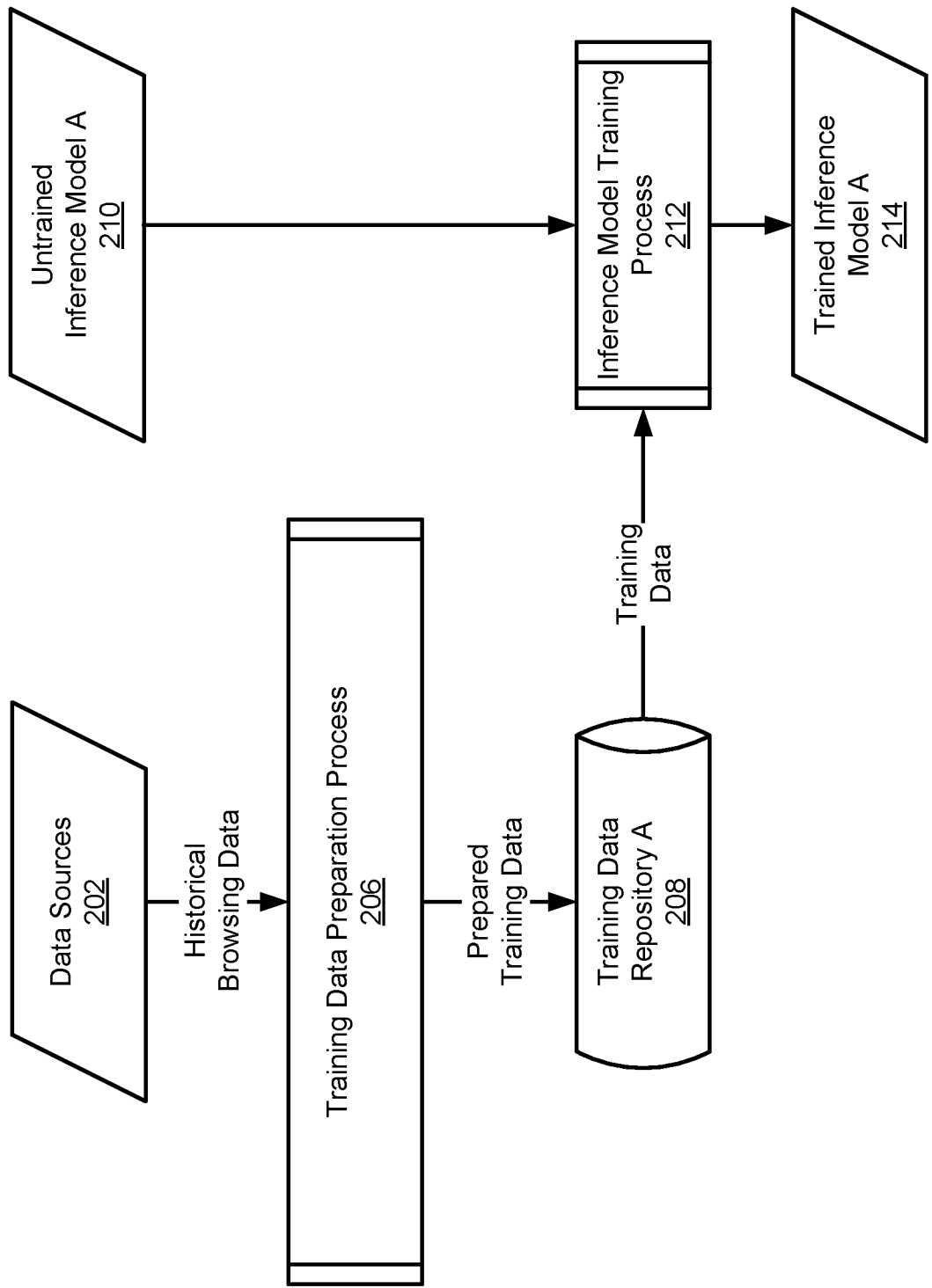
FIG. 2A shows a data flow diagram illustrating a process of obtaining a trained inference model in accordance with an embodiment.

Turning to FIG. 2A, a first data flow diagram in accordance with an embodiment is shown. The data flow diagram may illustrate the generation of inference models in a system similar to that of FIG. 1. The inference models may provide computer-implemented services (e.g., inference generation) for downstream consumers. A data processing system may, over time, generate inference models for various purposes. For example, inference models may generate inferences that may be used to recognize patterns, automate tasks, and/or make decisions.

The inference models may, for example, be implemented with artificial neural networks, decision trees, support-vector machines, regression analysis, Bayesian networks, genetic algorithms, and/or any other type of inference model usable for learning purposes. The type of inference model used may depend on the goals of the downstream consumers and/or other factors such as (i) training dataset characteristics (e.g., data type, size and/or complexity), (ii) cost limitations (e.g., the cost to train and/or maintain the inference model), (iii) time limitations (e.g., the time to train the inference model and/or for inference generation), and/or (iv) inference characteristics (e.g., accuracy and/or inference type).

For example, a complex inference model such as a multi-layered neural network may process a large amount of complex data and generate highly accurate inferences, but may be costly to train and maintain and may have low explainability (e.g., may act as a "black box"). In contrast, a linear regression model may be a simpler, less costly inference model with high explainability, but may only be well-suited for data whose labels are linearly correlated with the selected features and may generate less accurate inferences than a neural network.

Once an inference model type is selected, the inference model must be trained using training data that may be acquired from various data sources (e.g., various data processing systems). FIG. 2A shows training data in the form of historical browsing data gathered from data sources 202. Data sources 202 may include systems and/or databases that store browsing history and/or other sources of historical user action information. For example, data sources 202 may include one or more data processing systems 100 (e.g., that display a website to multiple users).

Data sources 202 may be obtained from any number of data processing systems managed by a data processing system manager. Data sources 202 may include any type and quantity of logs (e.g., browsing data), and may include metadata that describes actions leading up to an event (e.g., a series of operator actions and/or a series of user actions), and/or a description of an event. For example, the description of an event may be an undesirable operation such as a user exit, or the description of the event may be a normal operation, such as a purchase of a product by the user.

Data sources 202 may be implemented with structured or unstructured data and may include any number of past logs (e.g., historical browsing data). These historical logs may relate to historical user action information. Segments from the historical browsing data (e.g., log segments) may describe a series of operator actions, user actions, and/or user reactions (e.g., user actions in response to operator actions performed by the data processing system). For example, historical browsing data may include user action information such as (i) user action types (e.g., mouse clicks, content selection, user input of information, search initiation, user purchases, user reactions to operator actions, etc.), (ii) operator action types (e.g., suggested content, coupon pop-ups, etc.), (iii) content information (e.g., content type, identifiers of webpages a user has visited, etc.), and/or (iv) associated metadata (e.g., timestamp information, location data, etc.).

Historical browsing data may be tracked and/or recorded (e.g., session recordings) by one or more data processing systems 100 that may provide the website to the user (e.g., using cookie tracking, account tracking, etc.). For example, user action information may be tracked and/or collected by network providers (e.g., internet service providers, network administrators), software (e.g., operating systems, apps), websites (e.g., social media websites, search engines), etc. Historical browsing data from data sources 202 may be input to training data preparation process 206.

Training data preparation process 206 may collect long periods of historical log files from data sources 202. For example, the long periods of historical log files ("full log" files) may include log data reflecting hours of browsing activity. The full log files may include log patterns (e.g., series of operator actions) that may be related to past user actions, and the user actions may be associated with a time of action (e.g., from timestamp information recorded in the logs). The full log files may be analyzed using various analytics tools to measure and/or determine the input features of the training data (e.g., historical browsing data) before data labeling.

Training data preparation process 206 may include verifying and/or performing data labeling (e.g., associating two or more data samples from the collected training data) of full log files. For example, a full log file (e.g., input) may be associated with a past user exit (e.g., output). However, labeled training data may not always be reliable (e.g., a data sample may be improperly labeled by a user) and, if incorrectly labeled training data is used to train an inference model, then the trained inference model may generate inaccurate inferences. Thus, the quality of training data labels may be verified as part of training data preparation process 206. For example, unreliable labels may be removed from a portion of training data and that portion of training data may be implemented as unlabeled data during training.

The prepared training data from training data preparation process 206 may be stored in training data repository A 208. Any of the training data from training data repository A 208 may relate a full log file from data sources 202 to a user action, thereby including any portion of labeled data. User actions may be classified by type (e.g., user action type) and may include any action performed by the user, such as (i) exiting the website (e.g., a user exit), (ii) any type of user conversion (e.g., a user providing personal information and/or making a purchase), (iii) initiating a search, and/or (iv) any type of navigation within the website (e.g., visiting webpages of the website).

Training data repository A 208 may include any number of training datasets. The training datasets may be used to train an inference model to generate a prediction (e.g., an inference) regarding a potential user action type based on ingested data (e.g., historical browsing data).

Untrained inference model A 210 may be trained using training data (e.g., from training data repository A 208). To do so, untrained inference model A 210 and the training data may be input to inference model training process 212.

Inference model training process 212 may employ machine-learning techniques such as supervised learning (e.g., for labeled training data), and/or unsupervised learning (e.g., for unlabeled data) to produce any number of trained inference models, including trained inference model A 214. The trained machine-learning models may be implemented using other modalities (e.g., semi-supervised learning, reinforced learning, associative rules, etc.). As part of the training process, the trained inference model may undergo a validation and/or testing step to improve and/or measure the reliability of generated inferences. Any number of inference models may be trained using inference model training process 212.

Trained inference model A 214 may attempt to map an input dataset to a desired output dataset (e.g., generate inferences). The inferences may be generated from ingest data that may differ from the training data that was used to train trained inference model A 214. For example, trained inference model A 214 may be used to analyze new logs (e.g., real-time browsing data) from a data processing system and may predict a future user action. For example, trained inference model A 214 may be a classification inference model and may classify historical browsing data files from data sources 202 based on whether the log data indicates a user action may occur and/or by user action type (e.g., a user exit).

Over time, the trained inference models may need to be updated for a variety of reasons. For example, the trained inference models may become inaccurate, may not provide desired types of inferences, etc. Consequently, trained inference models (e.g., trained inference model A 214) may be periodically replaced and/or updated.

Thus, as illustrated in FIG. 2A, the system of FIG. 1 may obtain and/or train inference models used for the detection of future user actions based on log data (e.g., historical browsing data) of the data processing system. However, the detection of future user action types alone may not be sufficient to determine effective solutions to manage display of a website to the user, especially in more complex cases (e.g., where multiple user action types are predicted and/or when user actions and operator actions may be directly related). Thus, further analysis of relationships between log files and user actions may be performed to predict additional user action information such as time-to-user-action, operator actions (e.g., that may relate to the predicted user actions), time-on-page and/or session time of the user, likelihood of a conversion, etc.

Figure 2B:
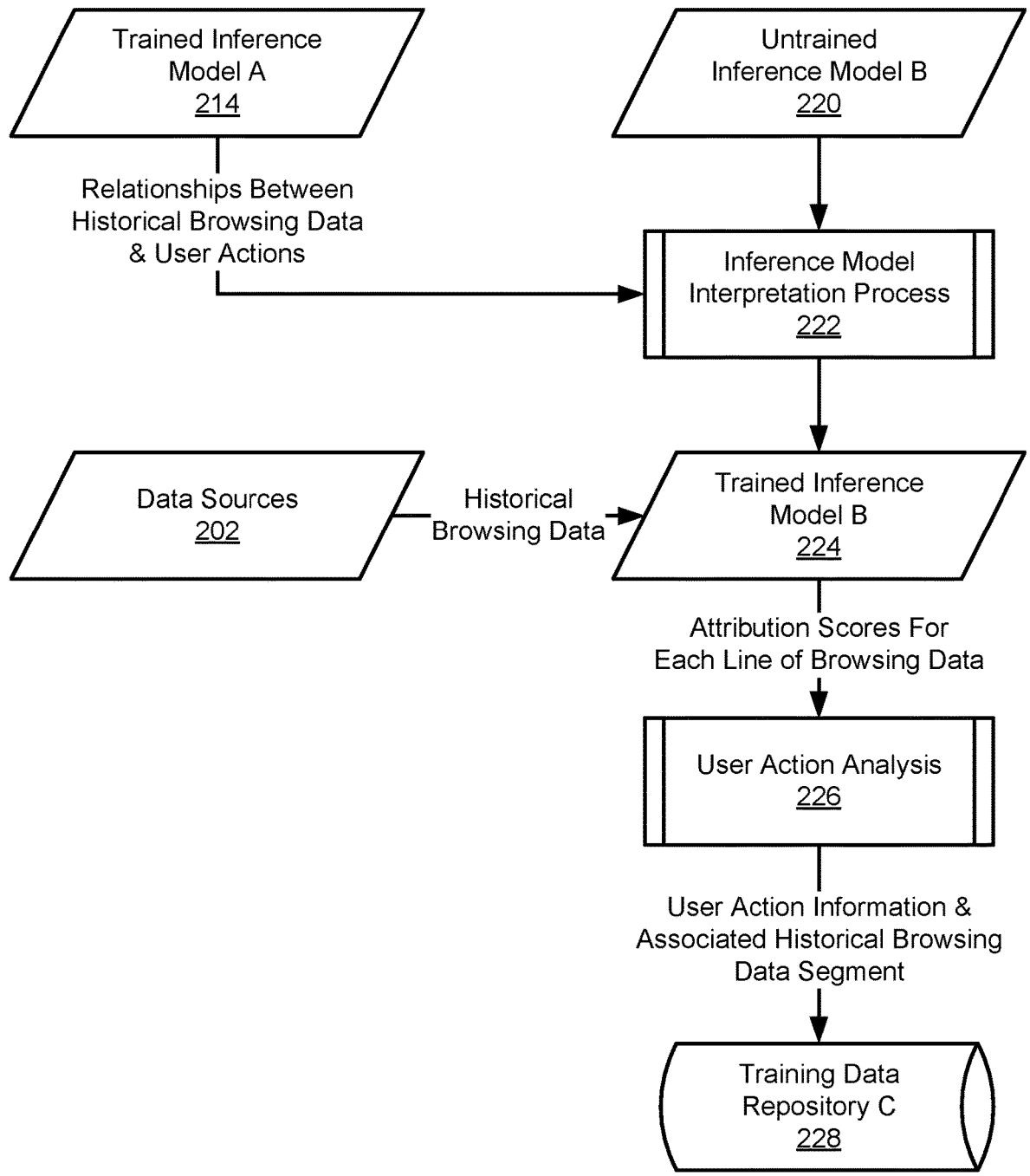
FIG. 2B shows a data flow diagram illustrating a process of obtaining user action information for a data processing system in accordance with an embodiment.

Turning to FIG. 2B, a second data flow diagram in accordance with an embodiment is shown. The data flow diagram illustrates a process of obtaining user action information. As previously mentioned, the user action information for a predicted user action type may be determined through analysis of attribution scores of log lines (e.g., of a log file) that may contribute to the predicted user action type.

To obtain attribution scores, trained inference model A 214 may be interpreted using an interpretation framework during model interpretation process 222. Relationships (e.g., defined by the architecture and parameters of trained inference model A 214) between full log files (e.g., historical browsing data) and user action types may be interpreted using an inference model interpretation framework. The inference model interpretation framework may perform local feature attribution using various methods (e.g., SHAP, Grad-CAM, etc.). The feature attribution method may output the relevance (e.g., contribution) of each input feature of the inference model to an output feature (e.g., an inference generated by the inference model).

For example, local feature attribution performed on trained inference model A 214 may output an attribution score for every line of a full log file for any number of predicted user actions. The attribution scores may be used to identify the portions of the log file that most impact the classification (e.g., user action type) predicted by trained inference model A 214. A positive attribution score may indicate the amount that the log line contributes to the user action type, and a zero attribution score may indicate that the log line may have no contribution to the user action type.

As part of model interpretation process 222, untrained inference model B 220 may be trained using training data generated from model interpretation process 222 (e.g., training data that relates log lines and attribution scores for one or more user action types). Untrained inference model B 220 may be trained using a training method similar to the one described in FIG. 2A. Once trained, trained inference model B 224 may assign attribution scores to each log line of an ingested full log file obtained from data sources 202. Any number of trained inference models may be generated using model interpretation process 222.

The attribution scores for each log line leading up to a predicted user action may be input to user action analysis 226. User action analysis 226 may perform a statistical analysis (e.g., computations of sums, standard-deviations, medians, and/or means) of the attribution scores for each log line of the full log file to identify log segments (e.g., smaller portions of the full log file) that contribute to one or more predicted user action types.

Some log lines of the log file may contribute to a predicted user action more than other log lines; therefore, to determine which portions of the historical browsing data contribute to a potential user action (e.g., and to predict which user action is most probable), aggregate attribution scores may be derived. The aggregate attribution scores may be used to define a segment of the historical browsing data (e.g., a portion of the full log file) associated with a user action type. The defined log segment may include a pattern within the full log file that relates to the occurrence of a predicted user action. In other words, the log segment may include a series of operator actions leading up to (e.g., causing) the predicted user action.

For example, a cumulative sum of attribution scores may be determined for each consecutive log line of the full log file for each user action type. The cumulative sum may represent the temperature of each log line (e.g., a heat map), denoting which log lines in the log file contribute to a predicted user action type. Log lines that have lower temperature values (e.g., lower cumulative attribution scores) may not contribute significantly to a user action (e.g., may not indicate a future user action), whereas log lines that have higher temperature values may contribute significantly to the user action. Log segments (e.g., groups of log lines) with higher temperatures (e.g., strong indications of a future user action) may be defined using virtual markers.

Virtual markers may be placed within a log file based on multiple attribution thresholds (e.g., defined by a user and/or based on statistical analysis). The virtual markers may be positioned throughout the full log file, and their placement may depend on the type of log file and/or the goal(s) of the analysis (e.g., one or more operational goals).

For example, a first virtual marker may be positioned at the first log line in the log file that has a temperature exceeding a minimum threshold, the first virtual marker indicating the beginning of a log segment. A second virtual marker may be positioned at a log line in the full log file (e.g., subsequent to the position of the first virtual marker) based on a time of a user action (e.g., the time at which the predicted user action occurred). The time of the user action may be supplied by data sources 202 (refer to FIG. 2A) as part of the user action information associated with the user action type. The second virtual marker may be positioned at a log line that has a timestamp that matches and/or is nearest the supplied time of user action.

A third virtual marker may be positioned between the first and second virtual markers. The third virtual marker may be positioned based on a threshold that may be determined based on a maximum aggregate score for the log file (e.g., a total cumulative sum of scores of every log line of the log segment). For example, a third virtual marker may be positioned at the first log line of the log segment that has a temperature exceeding a maximum threshold (e.g., 75% of the total cumulative sum for the segment). Any number of virtual markers may be placed within the log segment to define a portion of the log (e.g., the log segment) and any sub-portions thereof. For example, the third virtual marker may indicate an end of the log segment (e.g., when used for predicting future user actions), and/or the second virtual marker may indicate an end of the log segment (e.g., when used to determine additional user action information such as the time-to-user action).

For example, user action analysis 226 may determine a time-to-user-action based on one or more virtual markers positioned within the full log file. The time-to-user-action may be calculated by subtracting the timestamp value nearest to the third virtual marker from the timestamp value nearest to the second virtual marker (e.g., the time of user action). The user action type, time-to-user-action, and/or the associated log segment (e.g., defined by the first and third virtual markers) may be stored in training data repository C 228. The training data stored in training data repository C 228 may be used to train an inference model that predicts user action information (e.g., user action type and/or time-to-user-action) based on ingested log segments (e.g., portions of the historical browsing data reflecting shorter periods of time, such as seconds or minutes).

User action analysis 226 may determine user action information such as operator actions that relate to (e.g., may influence and/or cause) user actions and/or time-on-page of a user. For example, virtual markers may be used to define (e.g., based on attribution scores) a series of operator actions from the full log file that have a high likelihood of causing a user exit. User action analysis 226 may determine a time-on-page for a user by, for example, subtracting timestamps of two virtual markers indicating the start and end of the user's visit to a webpage.

Thus, as illustrated in FIG. 2B, the system of FIG. 1 may obtain and/or train an inference model that may generate attribution scores for lines of historical browsing data of ingested full log files. The attribution scores may be used to position virtual markers in a log file that may be used to (i) determine user action information for a predicted user action type (e.g., a time-to-user-action for a user action type), (ii) define a series of operator actions relating to (e.g., influencing and/or causing) the user action, and/or (iii) other user action information such as view time (e.g., time-on-page). The system of FIG. 1 may also generate and/or obtain the attribution scores to determine the user action information for a future user action.

Figure 2C:
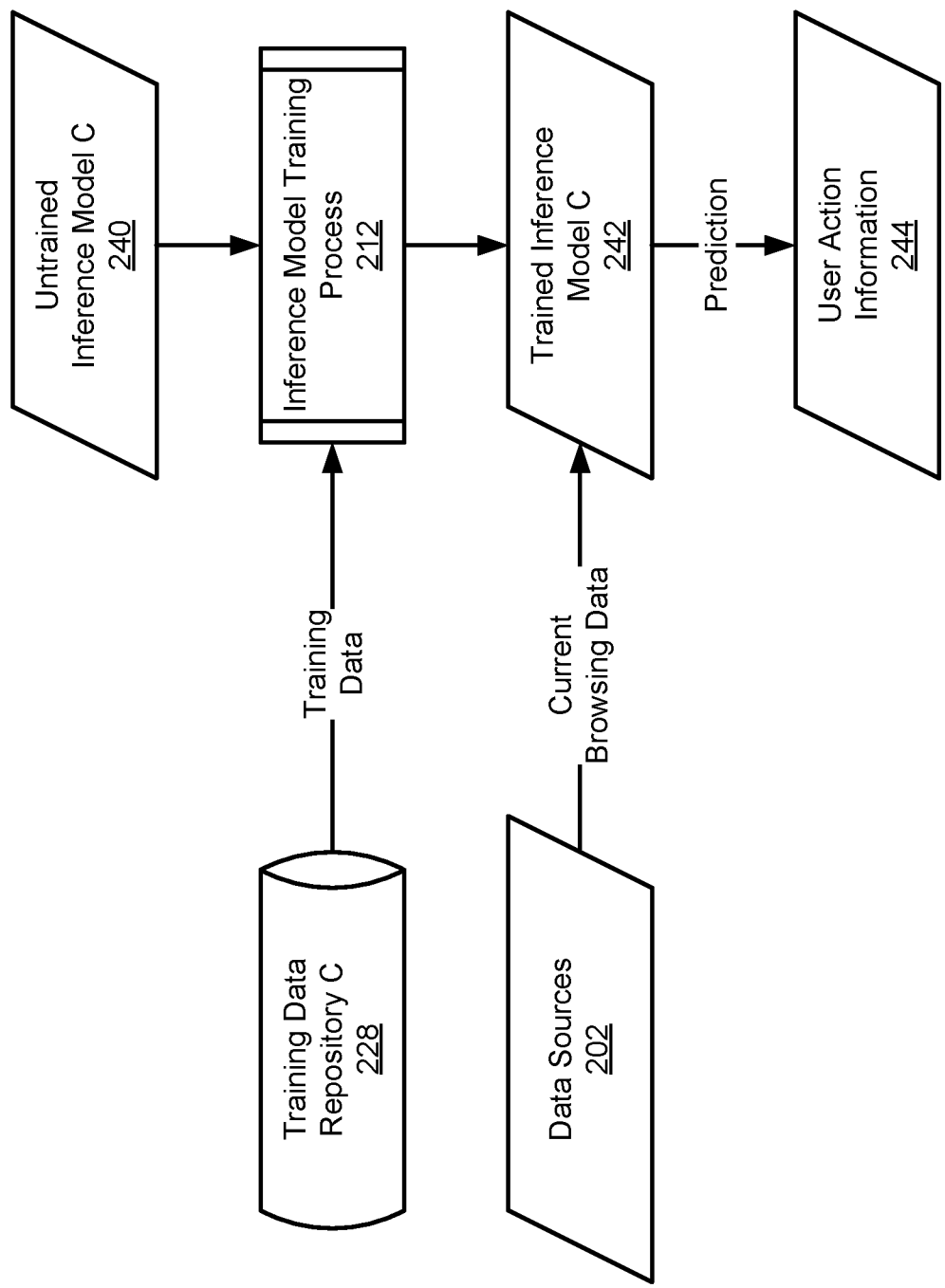
FIG. 2C shows a data flow diagram illustrating a process of determining user action information in accordance with an embodiment.

Turning to FIG. 2C, a third data flow diagram illustrating a process of determining user action information in accordance with an embodiment is shown. To predict user action information, an inference model may be trained using relational data stored in training data repository C 228.

Untrained inference model C 240 may undergo inference model training process 212 using training data from training data repository 228 C. The training process may be similar to the training process described with respect to FIG. 2A. The training data may relate log segments (e.g., portions of full log files and/or a series of operator actions) to a future user action type and/or time-to-user-action. Trained inference model C 242 may be trained to predict user action information from ingest data (e.g., log segments, such as short segments of historical browsing data).

For example, trained inference model C 242 may be a regression inference model and may predict a future user action type and the time-to-user-action based on an ingested log segment (e.g., current browsing data). The log segment may be a portion of a full log file, and the portion may be defined by the placement of two virtual markers (as described with respect to FIG. 2B). Trained inference model C 242 may generate predictions based on ingestion of a new log segment from data sources 202. The new log segment may be log data that is not included in training data used to train trained inference model C 242. The predictions (e.g., inferences) obtained from trained inference model C 242 may be reported (e.g., to a system administrator) as user action information 244.

User action information 244 may include (i) a predicted user action type, (ii) a time-to-user-action for the predicted user action type, (iii) a series of operator actions relating to (e.g., a portion of the log segment ingested by the trained inference model used to generate the predicted user action) the predicted user action, and/or (iv) other user action information (e.g., time-on-page).

Current browsing data obtained from data sources 202 may be portions of log files (e.g., real-time log files). For example, a log segment may be a 1-minute portion of a full log file that may be hours or days long. The log segments may be more efficiently ingested (e.g., read in parallel) and analyzed by trained inference model C 242 than a full log file. This increase in efficiency may result in an effective and efficient method of predicting user action type and/or time-to-user-action based on a series of operator actions in a log file, allowing for improved methods for managing future user actions in view of operational goals.

The components of FIG. 1 may perform methods to generate user action information by predicting future user actions and associated times-to-user-actions. The user action information may be predicted based on short log segments of log data (e.g., real-time browsing data) that reflects the operation of the data processing systems that provide computer-implemented services to the user.

Turning to FIG. 2D, an example of user action information in accordance with an embodiment is shown. Data table 250 shows five examples (e.g., each row showing a single data entry) of user action information 244 that may be generated using trained inference model C 242 (as described with respect to FIG. 2C). Each of the rows of data table 250 show a single data entry (e.g., a row) for a series of operator actions (e.g., "AABBCCC") relating to user actions (e.g., "U1"), and the time-to-user-action (e.g., "10"). The user action identifier (ID) may indicate the type of user action (e.g., the predicted user action). Data table 250 may include more rows than shown in FIG. 2D (e.g., may include more user action information), based on the user action information determined in user action analysis 226 (refer to the discussion of FIG. 2B).

As shown in data table 250, user action information 244 may include a single data entry of multiple user actions (e.g., ordered specifically to form a user action sequence). Each user action ID of the user action sequence may be associated with its own set of operator actions and/or time-to-user-action (e.g., user action sequences are depicted in rows 4 and 5). Moreover, user action information 244 may include multiple instances of the same user action ID, each with differing associated series of operator actions and/or times-to-user-actions, (e.g., depicted in rows 1 and 2). Due to multiple user action types and/or same user action sequences, user action information 244 may undergo additional processing steps such as data consolidation and/or aggregation (as will be described in further detail with respect to FIG. 3A).

Data table 250 (e.g., user action information 244) may include any number of data entries. The data entries may include any number and/or length of operator actions (e.g., series of operator actions) and/or any number of user action sequences (e.g., number of user actions per user action sequence). It will be appreciated that the example shown in FIG. 2D is simplified for the sake of clarity and that a larger number of complex data entries may be encountered in practice.

The components of FIG. 1 may perform methods to collect user action information as a collection of data entries (e.g., as shown in data table 250 of FIG. 2D). The user action information collected and/or stored by one or more data processing systems may be generalized as part of an acyclic user action graph generation process.

Figure 3A:
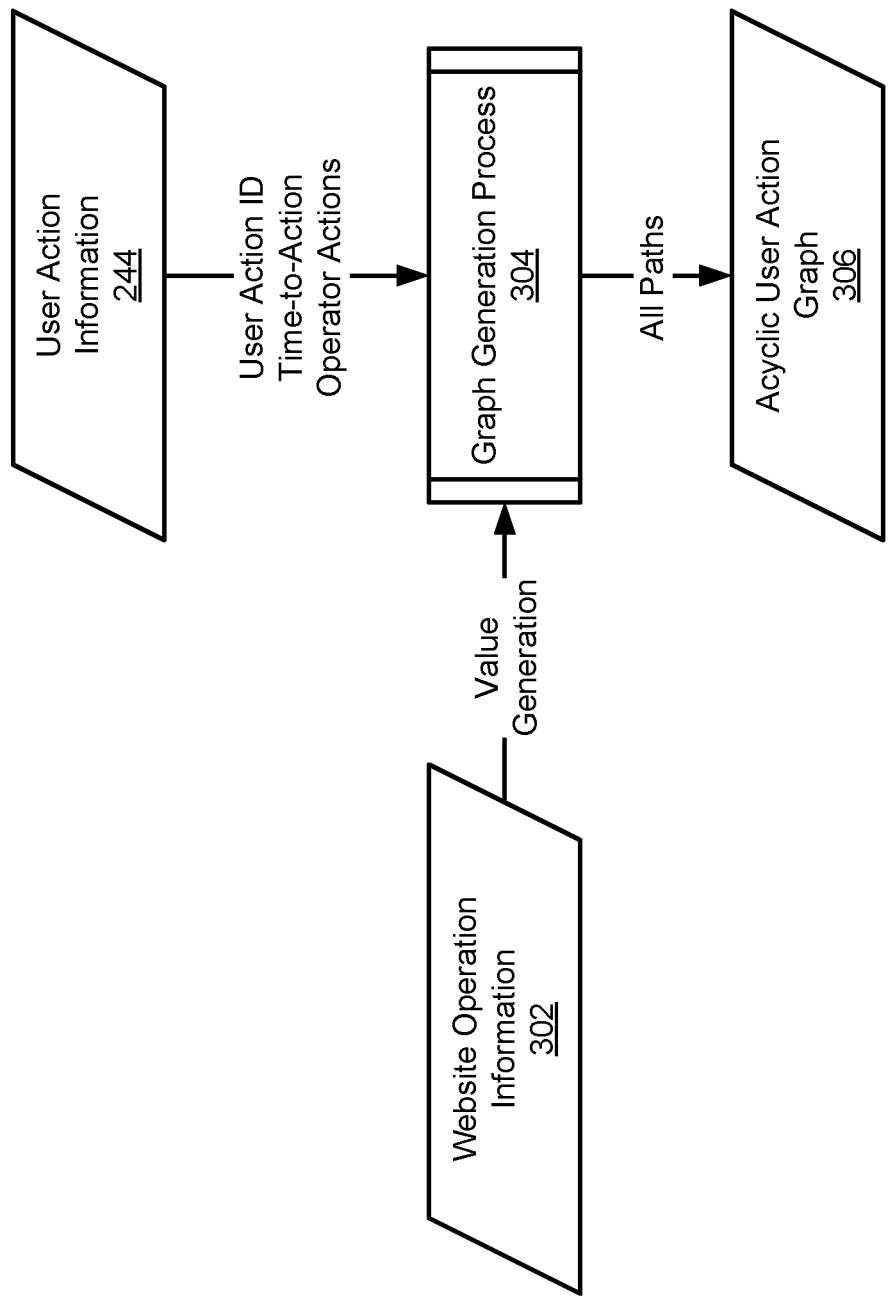
FIG. 3A shows a data flow diagram illustrating a process of generating an acyclic user action graph in accordance with an embodiment.

Turning to FIG. 3A, a fourth data flow diagram in accordance with an embodiment is shown. The data flow diagram illustrates a process of generating an acyclic user action graph. To generate the acyclic user action graph, user action information 244 and website operation information 302 may be input to graph generation process 304.

As described with respect to FIGS. 2C-2D, user action information 244 may include a user action ID, a time-to-user-action associated with the user action, and a log segment (e.g., series of operator actions) associated with the user action ID. Website operation information 302 may include web performance metrics (e.g., page load speed) and/or value generation information that assigns value to user actions. For example, website operation information 302 may include information regarding values (e.g., monetary) and/or other metrics (e.g., website metrics). For example, data from website operation information 302 may provide value for (i) information collection (e.g., of the user via the website), (ii) information conveyance (e.g., by the user via the website), (iii) advertisements (e.g., viewed by the user), and/or (iv) other types of user actions that may be considered valuable to the operator of the website (e.g., the sale of a product to the user via the website).

Graph generation process 304 may include preparing (e.g., processing) user action information 244 in order to be represented as an acyclic graph. The preparation of user action information 244 may include the consolidation of multiple similar or same data entries (e.g., as described with respect to FIG. 2D). The data consolidation process may employ methods of statistical analysis (e.g., computations of sums, standard-deviations, medians, and/or means).

For example, data entries with the same user action ID that have a similar (e.g., within a prescribed threshold) series of operator actions may be consolidated by generalizing the operator series of actions (e.g., using the mode of the operator series of actions). Similarly, for data entries with the same sequences of user action IDs and similar series of operator actions (e.g., the same generalized series of operator actions), the associated times-to-user-actions may be consolidated (e.g., using some statistical method of averaging) to generate a mean time-to-user-action (MTTUA).

User action information may be consolidated based on various user personas (e.g., types of users defined by a list of characteristics). The characteristics may include (i) demographic information (e.g., age, race, and/or other socioeconomic information), (ii) user location, and/or (iii) personal attributes of the user (e.g., user behavior, motivations and/or values). For example, user action information may be separated (e.g., bucketized) by user persona before being consolidated using statistical methods.

The consolidated user action information (e.g., generalized series of operator actions, MTTUA, and/or user action ID) may be used to generate acyclic user action graph 306. For example, from a starting point (e.g., a current status of a user interacting with a displayed website), a series of connected nodes may be established for a user action sequence, with each node representing a user action ID of the user action sequence. The series of nodes may be connected in a specific order (e.g., the order of the user action sequence) by edges. That is, the nodes may be connected to reflect the order of user actions. The user action sequence may terminate at an end point (e.g., the point at which the user may exit and/or terminate web services).

The edges used to connect the nodes may denote relationships between the nodes (e.g., the user action IDs). That is, a first user action may be performed prior to a second user action, and the edge that connects their representative nodes may indicate one or more relationships between them. The relationships may include (i) a duration of time (e.g., MTTUA) between the first user action and the second user action, (ii) a generalized series of operator actions that occurred between the time of the first user action and the time of the second user action, (iii) a value (e.g., monetary) associated with the second user action, and/or (iv) any other relationships that may be established between the two user actions (e.g., derived from consolidated user action information).

The nodes and edges may be established for any number of user action sequences, as determined by the input (e.g., consolidated user action information) to generate and/or obtain acyclic user action graph 306. Any number of acyclic graphs may be generated by graph generation process 304. For example, acyclic user action graphs may be generated for each of a number of user personas using bucketized user action information.

Figure 3B:
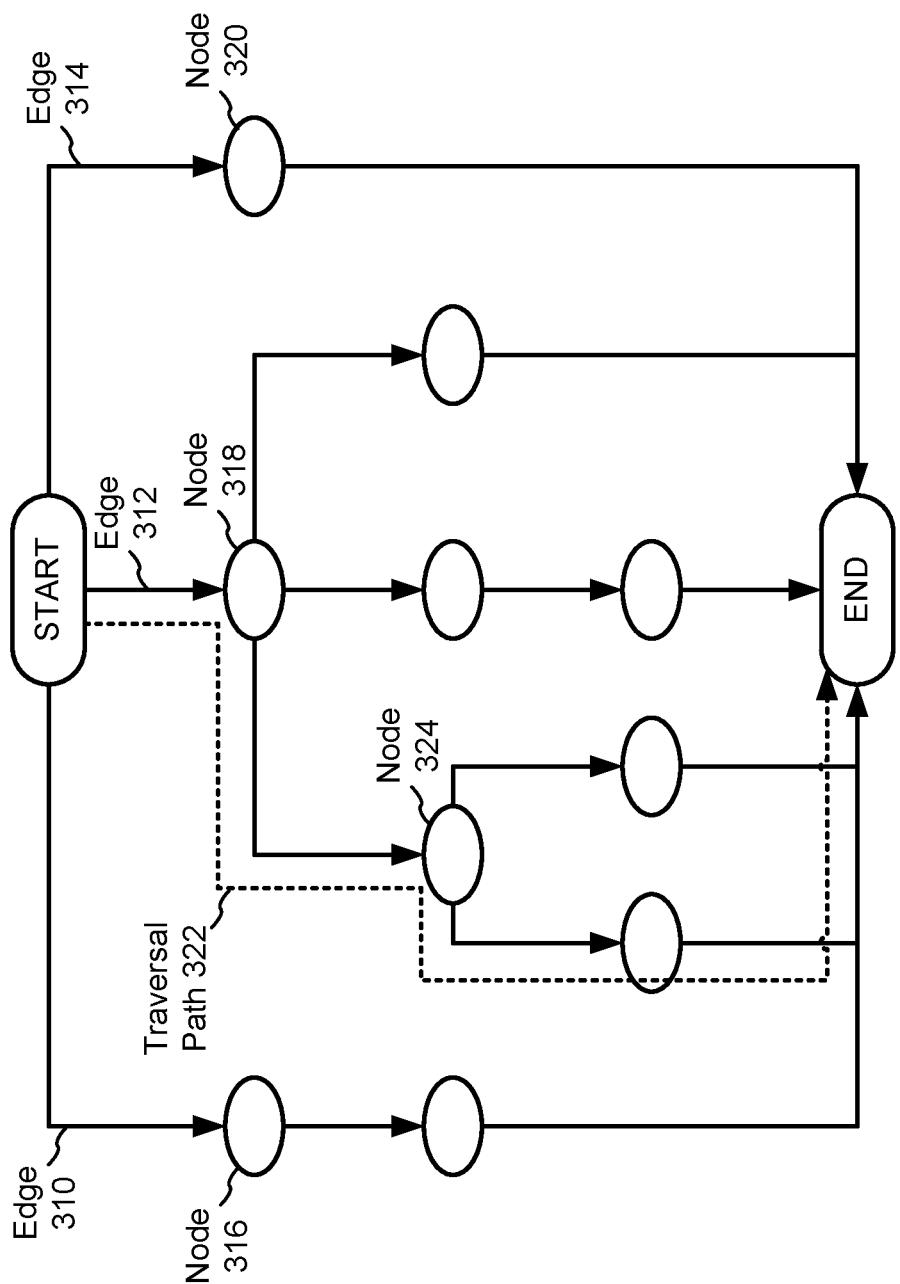
FIG. 3B shows an example of an acyclic graph in accordance with an embodiment.

Turning to FIG. 3B, an example of an acyclic graph in accordance with an embodiment is shown. The acyclic graph (e.g., representing consolidated user action information recorded by one or more data processing systems) shown in FIG. 3B may include nodes (e.g., nodes 316, 318, 320, and 324) and edges (e.g., edges 310, 312, 314) connecting corresponding nodes.

A progression through the acyclic graph may be referred to as a traversal path (e.g., stepping through the acyclic graph by visiting a series of connected nodes). The traversal path may begin at a source position (e.g., source node) and end at a destination position (e.g., destination node). For example, traversal path 322 begins at a "START" position of the acyclic graph and terminates at an "END" position of the acyclic graph.

For example, the source position may be a node and/or may be based on the current status of a user's interaction with a displayed website (e.g., no user actions have been performed, one user action has been performed, a particular series of user actions have been performed, etc.). The end position ("END") may denote user exit and/or termination of the web services. The progression through the acyclic graph (e.g., from START to END) may be referred to as a traversal path.

The edges connecting a first node and a second node may represent (i) a generalized series of operator actions that is likely to lead to the outcome associated with the second node (e.g., a user action) following the outcome associated with the first node (e.g., a different user action), (ii) a duration of time between when the outcome associated with the first node and the outcome associated with the second node are likely to occur, and/or (iii) other types of information regarding what is likely to occur if the generalized series of operator actions is performed after the outcome associated with the first node. The information associated with an edge may be denoted as one or more relationships (e.g., a set of relationships) between the two nodes. The relationships may be obtained from consolidated user action information (as described with respect to FIG. 3A).

The relationships may be used to ascertain how the performance of different series of operator actions are likely to impact the future actions of the user. For example, the edges may represent a generalized series of operator actions (e.g., that may be performed by a data processing system). Thus, from the START position in FIG. 3B, if an operator (e.g., of the data processing system) initiates performance of the generalized series of operator actions associated with edge 312, then node 318 may be visited, defining the first step of a traversal path. However, if the operator initiates performance of the generalized series of operator actions associated with edge 310 or edge 314, then the first step of the traversal path may be to node 316 or node 320, respectively.

In the example of an acyclic user action graph, the edges (e.g., sets of relationships) may indicate characteristics (e.g., a probable MTTUA) regarding the process of user actions performed (e.g., while consuming web services). For example, traversal path 322 begins at the START position which may be associated with the current status of user interaction of a website (e.g., no user actions have occurred). The operator may initiate performance a first series of operator actions associated with edge 312 to define the first step of traversal path 322 (e.g., to node 318, which may represent a first user action). Next, the operator may initiate performance of a second series of operator actions associated with the edge connecting node 324, representing a second user action.

The set of relationships represented by edges of an acyclic user action graph may also include a MTTUA and/or an average value (e.g., an average monetary value gained or lost by the operator of the website). For example, from the START position, if the operator performs the generalized series of operator actions associated with edge 312, then the MTTUA may indicate the time-to-user-action before the user performs the action represented by node 318. If the user action represented by node 318 occurs, then the value may indicate the value gained or lost due to the performed user action.

For example, if the user action represented by node 318 results in a monetary gain by the operator (e.g., a relationship represented by edge 312 is a positive monetary value), then the operator may perform the generalized series of actions associated with edge 312 in order to increase the likelihood of the user performing the user action represented by node 318 (e.g., increasing the likelihood of a positive outcome for the operator). However, if a relationship represented by edge 312 is a negative monetary value, then the operator may perform the generalized series of actions associated with either edge 310 or edge 314 in order to increase the likelihood of avoiding the monetary loss (e.g., a negative outcome for the operator).

The entirety of traversal path 322 may represent the probable outcome of the provided web services if an operator initiates performance of the multiple series of operator actions (e.g., the multiple series of operator actions being associated with each edge of traversal path 322). Thus, traversal path 322 may represent a user action sequence. Multiple traversal paths (e.g., a set of traversal paths) may be defined for an acyclic graph to create a set of traversal paths. For example, all possible traversal paths may be enumerated. The set of traversal paths may include every unique path combination between a starting position and an end position.

Once a traversal path is established, aggregate relationships may be obtained. The aggregate relationships may be obtained by combining the relationships of each edge of the traversal path. For example, a cumulative MTTUA and a total average value may be obtained by summing each of the MTTUA and each of the values for each edge of traversal path 322, respectively. Thus, to control and/or optimize the traversal path, the operator may perform a specific operator action set (e.g., multiple generalized series of operator actions). To optimize the traversal path, the acyclic user action graph may be analyzed (e.g., recursively). Based on the analysis, a best-fit traversal path may be determined, for example, that optimizes one or more operational goals.

It should be appreciated that the example shown in FIG. 3B is simplified for the sake of clarity and that a more complex acyclic graph with a larger number of nodes and/or edges (e.g., traversal paths) may be encountered in practice.

Turning to FIG. 3C, a fifth data flow diagram in accordance with an embodiment is shown. The data flow diagram illustrates a process of analyzing an acyclic user action graph. To analyze acyclic user action graph 306, acyclic user action graph 306 and objective function 330 may be input to graph analysis process 332. Acyclic user action graph 306 may be obtained from graph generation process 304, as described with respect to FIG. 3A.

Objective function 330 may be a mathematical representation of one or more operational goals. The operational goals may include (i) maximizing the MTTUA before a user action (e.g., maximizing average time-on-page), (ii) minimizing the MTTUA before a particular user action (e.g., a user action that may lead to a positive outcome for the operator), (iii) minimizing or maximizing the MTTUA for a sequence of user actions (e.g., maximizing average session time), (iv) maximizing a value associated with a relationship between two or more user actions (e.g., maximizing operator revenue), and/or (v) other types of goals (e.g., relating to average time-on-page, conversion rate, bounce rate, user information collection and/or information conveyance, etc.). Objective function 330 may be used during graph analysis process 332 to determine a traversal path that optimizes the operational goal (e.g., a best-fit traversal path), and/or rank various traversal paths with respect to one or more operational goals.

To do so, graph analysis process 332 may include identifying and/or enumerating all possible traversal paths of acyclic user action graph 306. The traversal paths may be analyzed independently to determine a fitness value of each traversal path with respect to an operational goal. For example, the fitness value of a traversal path may describe how well one or more aggregate relationships of the traversal path fit the operational goal.

The fitness value of a traversal path may be used to rank each traversal path (e.g., in ascending order of fitness value) to determine the best-fit traversal path. For example, a traversal path with a higher fitness value (e.g., higher rank) may best fit the operational goal (e.g., objective function). Thus, the traversal path with the largest rank may be identified as the best-fit traversal path.

Once the best-fit traversal path has been identified, graph analysis process 332 may use information regarding the best-fit traversal path from acyclic user action graph 306 to obtain recommended operator action set 334. The information may include a relationship of an edge and/or an aggregate relationship of one or more edges of the best-fit traversal path. For example, a series of operator actions associated with an edge of the best-fit traversal path may be recommended to be performed (e.g., via a system notification to an operator). The series of actions described in recommended operator action set 334 may allow the operator to prevent and/or mitigate a negative outcome (e.g., for the operator) of a user action and/or modify a user action sequence.

Graph analysis process 332 may be performed in real-time (e.g., based on changes in the current website browsing actions of the user) and thus, recommended operator action set 334 may be dynamic and/or may be provided to a user in real-time to increase the likelihood of meeting operational goals.

In practice, the analysis of large and/or complex acyclic user action graphs may be performed using one or more trained inference models. The models may be trained to recursively evaluate traversal paths of an acyclic graph in view of an operational goal. Based on new ingest data (e.g., real-time monitoring of user actions performed on a website), the inference model may generate an inference describing a recommended operator action set for the data processing system to perform.

Further, the recommended operator action set may be used to determine appropriate allocations of limited computing resources. For example, if an operator action set includes suggesting a particular type of content (e.g., webpage) in order to achieve operational goals, then more computing resources (e.g., bandwidth and/or processing power) may be allocated to the generation and/or delivery of that type of content to the user.

Thus, as illustrated in FIGS. 3A-3C, the system of FIG. 1 may obtain and/or generate an acyclic user action graph describing possible user action sequences based on consolidated user action information. The system of FIG. 1 may also analyze the acyclic user action graph in order to provide an operator action set. The operator action set may be initiated (e.g., by an operator of a data processing system) to increase the likelihood of meeting an operational goal, improving the efficiency of managing and/or maintaining the display of the website to the user.

FIG. 4 shows a flow diagram illustrating a method of managing display of a website to a user in accordance with an embodiment. The method may be performed by the system of FIG. 1. Any of the operations described with respect to FIG. 4 may be performed in different orders, skipped, repeated, and/or be performed in a parallel or partially overlapping in time manner.

At operation 402, historical browsing data may be obtained for the website. The historical browsing data may be obtained by (i) receiving the historical browsing data from one or more data processing systems and/or devices, (ii) reading the historical browsing data from storage, and/or (iii) generating the historical browsing data. Historical browsing data may be generated by tracking and/or recording the activity of one or more users of the website over long periods of time (e.g., generating log data of user and/or operator actions). That is, the historical browsing data may reflect visits to the website of multiple users.

Portions of the historical browsing data (e.g., log segments) may be ingested into a trained inference model. The trained inference model may be similar to trained inference model C 242 (as described with respect to FIG. 2C) and may generate user action information in the form of a prediction. The prediction may include user action information regarding one or more predicted user actions, predicted based on a pattern of actions (e.g., a series of operator actions and/or user actions) in the ingested log data. The user action information may include the user action type (e.g., a user action ID), the time-to-user-action, the series of operator actions recorded in the log segment that may have led up to the user action, and/or other types of user action information.

When presented with historical browsing data, the inference model may predict a particular order of future user actions (e.g., a user action sequence of action IDs), and the associated user action information for each identified user action in the sequence. The predictions (e.g., user action information) generated by the inference model may be consolidated and/or represented by an acyclic graph.

At operation 404, an acyclic graph is obtained based on the historical browsing data. The acyclic graph may be obtained by (i) receiving the acyclic graph from one or more data processing systems and/or devices, (ii) reading the acyclic graph from storage, and/or (iii) generating the acyclic graph. The acyclic graph may be generated using a graph generation process. The graph generation process may include preparing (e.g., consolidating and/or aggregating) user action information obtained in operation 402, and obtaining website operation information (e.g., value generation information and/or web performance metrics) from various data sources. The consolidated user action information may be probabilistically (and/or statistically) determined (e.g., using processes similar to those described with respect to FIG. 3A).

The consolidated user action information may be used to establish a series of nodes connected by edges. The nodes may represent user actions and the edges may represent relationships between the user actions. The series of nodes may be connected in a specific order, indicating an order of subsequent user actions (e.g., a user action sequence).

For example, to construct the acyclic graph, a second node in the sequence may represent a second user action with respect to the website that occurs after a first node (e.g., a first user action with respect to the website) in the sequence. The first and second node may be connected by an edge that represents a relationship between the first and second user actions (e.g., a MTTUA, a generalized series of operator actions, and/or an total average value). That is, the edges may indicate a duration of time between occurrences of user actions, a value associated the user performing the second user action, and/or a series of operator actions that may lead up to (e.g., positively influence) the second user action.

Continuing with the construction of the acyclic graph, the second node may be connected to a third node, representing a third user action with respect to the website that occurred after the second user action. The second and third node may be connected by a second edge, the second edge representing a relationship between the second and third user actions. The first, second, and third user actions may define a user action sequence that may terminate at an end position. The end position may correspond to a user action that terminates the user action sequence, such as a user exit, and/or any other type of action that terminates the web services.

The construction of the acyclic graph may continue based on the content of the consolidated user action information. Once constructed, traversal paths may be defined through the acyclic graph by connecting consecutive nodes within a user action sequence from a starting position to an end position. Multiple traversal paths may be defined (e.g., all possible traversal paths through the acyclic graph). The traversal paths may be used to determine how to optimize operational goals.

At operation 406, an operational goal for the website may be identified. The operational goal may be identified by (i) receiving the operational goal from one or more data processing systems, (ii) reading the operational goal from storage, and/or (iii) receiving the operational goal from another device. The operational goal may be determined by an operator of the data processing system that provides computer-implemented services (e.g., web services) to the user. Any number of operational goals may be identified.

For example, the operational goal may include (i) bounce rate minimization (e.g., to maintain and/or reduce user exits), (ii) revenue maximization (e.g., by increasing user advertisement views and/or user purchases of a product through the website), (iii) conversion maximization (e.g., user downloads, subscriptions sign-ups, user clicks on affiliate links, product sales, etc.), (iii) user time maximization (e.g., session time and/or time-on-page), and/or (iv) any other operational goal that may improve the performance of the web services and/or mitigate negative outcomes for the operator of the data processing system. The operational goal may be represented mathematically (e.g., as an objective function), and may be used to analyze an acyclic graph.

At operation 408, the acyclic graph may be analyzed, based on the operational goal, to obtain an action set (e.g., operator action set) for the website. The acyclic graph may be analyzed by performing a graph analysis process, similar to the process described with respect to FIG. 3C. For example, the graph analysis process may include enumerating each traversal path (e.g., of all possible traversal paths) through the acyclic graph.

A fitness value may be assigned to each of the enumerated traversal paths, based on one or more aggregate relationships for each of the traversal paths, and/or the objective function (e.g., which may take into account any number of aggregate relationships). The fitness values for the traversal paths may indicate which traversal path is likely to meet the operational goal, and/or an ordering of the traversal paths with respect to the likelihood of each traversal paths meeting the goals. Thus, the traversal paths may be ranked based on the fitness value. For example, the traversal paths may be ordered in descending order of fitness values and ranked (e.g., using consecutive positive integers). If a higher fitness value indicates a closer fit to the objective function, then the lowest ranked traversal path may be selected as a best-fit traversal path.

Relationships associated with the best-fit traversal path may be used to obtain an operator action set. For example, each of the generalized series of operator actions associated with each edge of the best-fit traversal path may be concatenated to produce an operator action set for the data processing system providing display of the website to the user. The operator action set may be determined based on the current browsing status of the user. The operator action set may include timestamps (e.g., indicating when to perform one or more of the series of operator actions), and/or other instructions regarding implementing the operator action set.

At operation 410, performance of the action set (e.g., operator action set) by a data processing system that displays the website to the user is initiated. The performance of the operator action set may be initiated by an operator (e.g., a user of the data processing system providing display of the website to the user). The operator may receive a notification regarding one or more actions to influence, mitigate and/or prevent a user action. The operator action set may include (i) providing a specific type of content to the user, (ii) recommending new content to the user, (iii) re-ordering content based on its relevance to the user, (iv) initiating an interaction with the user (e.g., chat bots, pop-ups such as coupons and/or user surveys), (v) re-allocating computing resources in order to provide relevant content to the user efficiently (e.g., reducing page load times of popular pages, reducing download times of popular content, etc.), and/or (vi) performing other actions that may increase the likelihood of meeting the operational goal.

The method may end following operation 410.

While described above in operations 404-410 with active steps of analysis, it will be appreciated that inference models based on the acyclic graph and/or objective functions may be generated and used to obtain operator action sets. For example, one or more predictive inference models (e.g., machine-learning models) may be trained to ingest current website browsing data of a user and output a corresponding operator action set. Thus, the inference models may generalize the information included in the acyclic graph thereby allowing for conditions that do not perfectly map to previously encountered conditions to be analyzed to determine which actions to include in an operator action set.

Thus, as illustrated above, embodiments disclosed herein may provide systems and methods usable to manage display of a website to a user. Trained inference models may be implemented to analyze log segments of historical browsing data obtained from data processing systems, and to predict user actions and sequences thereof. The predicted user action sequences may be presented in the form of an acyclic graph. The acyclic graph may be analyzed along with real-time website browsing data of a user to determine a set of operator actions that the data processing system displaying the website to the user may perform to manage future user actions according to operational goals.

Thus, embodiments disclosed herein may provide an improved computing device that is able to extract useful information from log data, usable for management purposes. Further, the disclosed process may facilitate identification of relationships that a person may easily overlook. Accordingly, the disclosed process provides for both an embodiment in computing technology and an improved method for management of web services. Rather than relying on a person's intuition or expert knowledge, an automated process for analysis may be provided.

Figure 5:
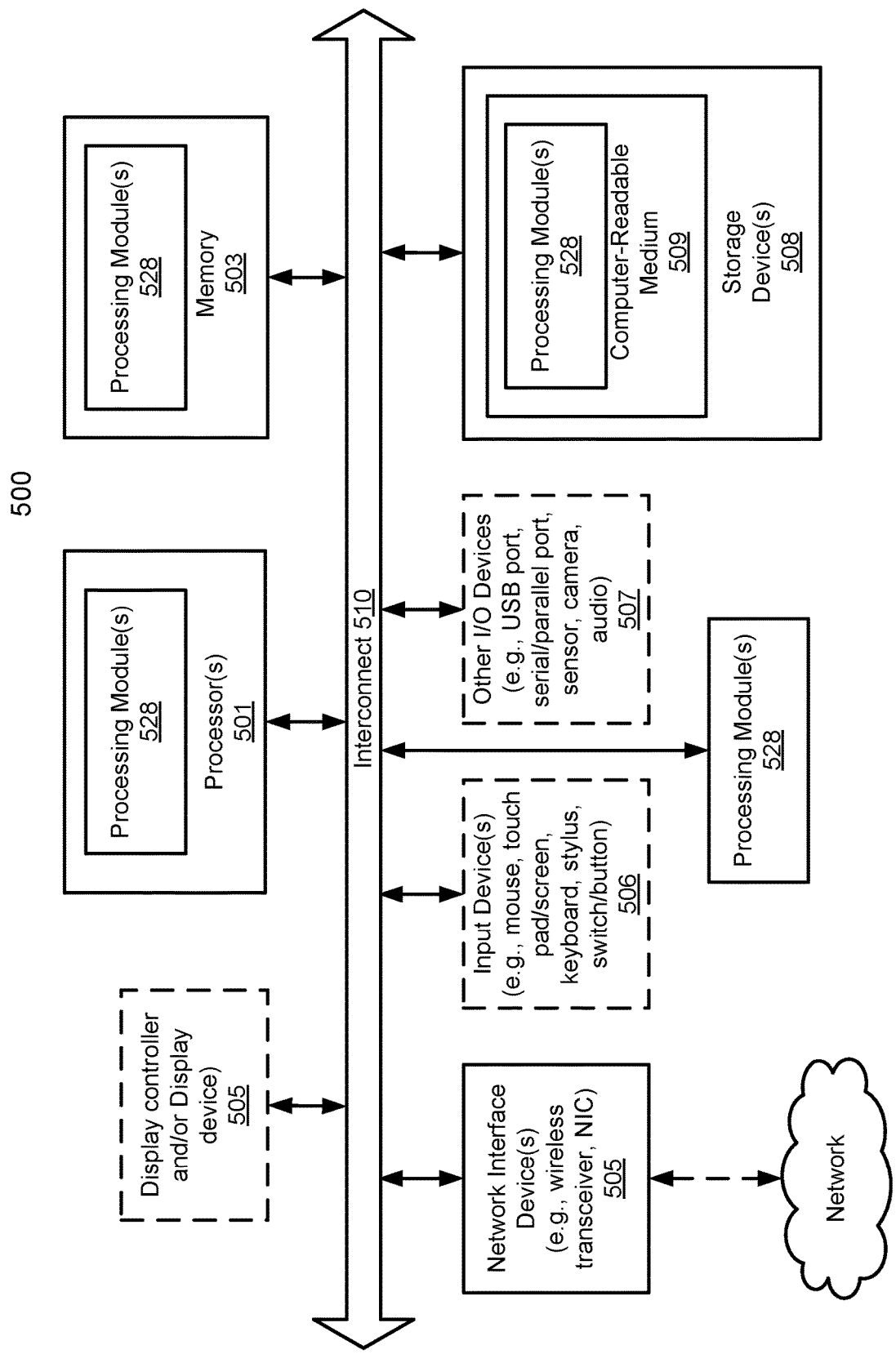
FIG. 5 shows a block diagram illustrating a data processing system in accordance with an embodiment.

Any of the components illustrated in FIGS. 1-4 may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high-level view of many components of the computer system. However, it is to be understood that additional components may be present in certain implementations and furthermore, different arrangement of the components shown may occur in other implementations.

System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-408 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like.

More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets.

Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with an optional graphics subsystem, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random-access memory (RAM), dynamic RAM (DRAM), synchronous DRAM (SDRAM), static RAM (SRAM), or other types of storage devices. Memory 503 may store information including sequences of instructions that are executed by processor 501, or any other device.

For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs, or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing display of a website to a user, comprising:
obtaining historical browsing data for the website;
obtaining an acyclic graph based on the historical browsing data, the acyclic graph comprising a plurality of nodes connected by a plurality of edges, the plurality of edges representing relationships between the plurality of nodes, the relationships being probabilistically defined based on the historical browsing data, and obtaining the cyclic graph further comprises:
establishing a first node of the plurality of nodes based on a first user action with respect to the website;
establishing a second node of the plurality of nodes based on a second user action with respect to the website, the second user action occurring after the first user action; and
establishing a first edge between the first node and the second node, the first edge indicating a first generalized series of operator actions that are likely to occur between occurrence of the first user action and occurrence of the second user action, and the first generalized series of operation actions being first actions performed by the data processing system that is displaying the website to the user in response to first instructions provided to the data processing system from another data processing system associated with an operator of the website;
identifying an operational goal for the website;
analyzing the acyclic graph, based on the operational goal, to obtain an action set for the website; and
initiating performance of the action set by a data processing system that displays the website to the user, to increase a likelihood of meeting the operational goal.

2. The method of claim 1, wherein obtaining the acyclic graph further comprises:
establishing a third node based on a third user action with respect to the website, the third user action occurring after the second user action; and
establishing a second edge between the second node and the third node.

3. The method of claim 2, wherein the first edge further indicates a duration of time that is likely to have passed between occurrence of the first user action and occurrence of the second user action.

4. The method of claim 3, wherein the second edge indicates a duration of time that is likely to have passed between occurrence of the second user action and occurrence of the third user action.

5. The method of claim 1, wherein the second edge indicates a second generalized series of operator actions that are likely to occur between occurrence of the second user action and occurrence of the third user action, the second generalized series of operation actions being second actions performed by the data processing system that is displaying the website to the user in response to second instructions provided to the data processing system from the other data processing system associated with the operator of the website.

6. The method of claim 1, wherein the operational goal is selected from a group of operational goals consisting of bounce rate minimization, revenue maximization, conversion maximization, session time maximization, and time-on-page maximization.

7. The method of claim 6, wherein the historical browsing data reflects visits to the website of multiple users.

8. The method of claim 1, wherein analyzing the acyclic graph comprises:
enumerating traversal paths through the acyclic graph;
for each traversal path of the enumerated traversal paths:
obtaining an aggregate relationship based on the relationship of each of the edges along the traversal path,
obtaining a fitness value based on the aggregate relationship and the operational goal, and
obtaining a rank for the traversal path based on the fitness value, the rank being usable to order the traversal paths;
selecting a best fit traversal path of the traversal paths based on the ranks of the traversal paths; and
obtaining the action set based on the best fit traversal path.

9. A non-transitory machine-readable medium having instructions stored therein, which when executed by a processor, cause the processor to perform operations for managing display of a website to a user, the operations comprising:
obtaining historical browsing data for the website;
obtaining an acyclic graph based on the historical browsing data, the acyclic graph comprising a plurality of nodes connected by a plurality of edges, the plurality of edges representing relationships between the plurality of nodes, the relationships being probabilistically defined based on the historical browsing data, and obtaining the cyclic graph further comprises:
establishing a first node of the plurality of nodes based on a first user action with respect to the website;
establishing a second node of the plurality of nodes based on a second user action with respect to the website, the second user action occurring after the first user action; and
establishing a first edge between the first node and the second node, the first edge indicating a first generalized series of operator actions that are likely to occur between occurrence of the first user action and occurrence of the second user action, and the first generalized series of operation actions being first actions performed by the data processing system that is displaying the website to the user in response to first instructions provided to the data processing system from another data processing system associated with an operator of the website;
identifying an operational goal for the website;
analyzing the acyclic graph, based on the operational goal, to obtain an action set for the website; and
initiating performance of the action set by a data processing system that displays the website to the user, to increase a likelihood of meeting the operational goal.

10. The non-transitory machine-readable medium of claim 9, wherein obtaining the acyclic graph further comprises:
establishing a third node based on a third user action with respect to the website, the third user action occurring after the second user action; and
establishing a second edge between the second node and the third node.

11. The non-transitory machine-readable medium of claim 10, wherein the first edge further indicates a duration of time that is likely to have passed between occurrence of the first user action and occurrence of the second user action.

12. The non-transitory machine-readable medium of claim 11, wherein the second edge indicates a duration of time that is likely to have passed between occurrence of the second user action and occurrence of the third user action.

13. The non-transitory machine-readable medium of claim 9, wherein the second edge indicates a second generalized series of operator actions that are likely to occur between occurrence of the second user action and occurrence of the third user action, the second generalized series of operation actions being second actions performed by the data processing system that is displaying the website to the user in response to second instructions provided to the data processing system from the other data processing system associated with the operator of the website.

14. The non-transitory machine-readable medium of claim 9, wherein analyzing the acyclic graph comprises:
enumerating traversal paths through the acyclic graph;
for each traversal path of the enumerated traversal paths:
obtaining an aggregate relationship based on the relationship of each of the edges along the traversal path,
obtaining a fitness value based on the aggregate relationship and the operational goal, and
obtaining a rank for the traversal path based on the fitness value, the rank being usable to order the traversal paths;
selecting a best fit traversal path of the traversal paths based on the ranks of the traversal paths; and
obtaining the action set based on the best fit traversal path.

15. A data processing system, comprising:
a processor; and
a memory coupled to the processor to store instructions, which when executed by the processor, cause the processor to perform operations for managing display of a website to a user, the operations comprising:

obtaining historical browsing data for the website;

obtaining an acyclic graph based on the historical browsing data, the acyclic graph comprising a plurality of nodes connected by a plurality of edges, the plurality of edges representing relationships between the plurality of nodes, the relationships being probabilistically defined based on the historical browsing data, and obtaining the cyclic graph further comprises:

establishing a first node of the plurality of nodes based on a first user action with respect to the website;

establishing a second node of the plurality of nodes based on a second user action with respect to the website, the second user action occurring after the first user action; and establishing a first edge between the first node and the second node, the first edge indicating a first generalized series of operator actions that are likely to occur between occurrence of the first user action and occurrence of the second user action, and the first generalized series of operation actions being first actions performed by the data processing system that is displaying the website to the user in response to first instructions provided to the data processing system from another data processing system associated with an operator of the website;

identifying an operational goal for the website;

analyzing the acyclic graph, based on the operational goal, to obtain an action set for the website; and initiating performance of the action set by a data processing system that displays the website to the user, to increase a likelihood of meeting the operational goal.

16. The data processing system of claim 15, wherein obtaining the acyclic graph further comprises:

establishing a third node based on a third user action with respect to the website, the third user action occurring after the second user action; and establishing a second edge between the second node and the third node.

17. The data processing system of claim 16, wherein the first edge further indicates a duration of time that is likely to have passed between occurrence of the first user action and occurrence of the second user action.

18. The data processing system of claim 17, wherein the second edge indicates a duration of time that is likely to have passed between occurrence of the second user action and occurrence of the third user action.

19. The data processing system of claim 16, wherein the second edge indicates a second generalized series of operator actions that are likely to occur between occurrence of the second user action and occurrence of the third user action, the second generalized series of operation actions being second actions performed by the data processing system that is displaying the website to the user in response to second instructions provided to the data processing system from the other data processing system associated with the operator of the website.

20. The data processing system of claim 16, wherein analyzing the acyclic graph comprises: enumerating traversal paths through the acyclic graph; for each traversal path of the enumerated traversal paths: obtaining an aggregate relationship based on the relationship of each of the edges along the traversal path, obtaining a fitness value based on the aggregate relationship and the operational goal, and obtaining a rank for the traversal path based on the fitness value, the rank being usable to order the traversal paths; selecting a best fit traversal path of the traversal paths based on the ranks of the traversal paths; and obtaining the action set based on the best fit traversal path.

* * * * *